United States Patent [19]

Müller et al.

[11] 4,101,812
[45] Jul. 18, 1978

[54] PHOTOGRAPHIC FLASH UNIT

[75] Inventors: Ludwig Friedrich Müller; Adolf Schott, both of Fürth; Wolfgang Pecher, Gremsdorf, all of Germany

[73] Assignee: Metz Apparatewerke, Furth, Germany

[21] Appl. No.: 787,988

[22] Filed: Dec. 30, 1968

[30] Foreign Application Priority Data

| Feb. 2, 1968 | [DE] | Fed. Rep. of Germany | 1622230 |
| Dec. 28, 1967 | [DE] | Fed. Rep. of Germany | 1597325 |
| Mar. 30, 1968 | [DE] | Fed. Rep. of Germany | 1772104 |
| Apr. 18, 1968 | [DE] | Fed. Rep. of Germany | 1764175 |
| May 11, 1968 | [DE] | Fed. Rep. of Germany | 1772411 |
| Jun. 11, 1968 | [DE] | Fed. Rep. of Germany | 1772617 |

[51] Int. Cl.² .................................... H05B 37/00
[52] U.S. Cl. .................. 315/241 P; 315/151; 315/159; 354/33
[58] Field of Search ............. 315/241 P, 151, 159; 354/33, 145

[56] References Cited

U.S. PATENT DOCUMENTS

| 2,358,796 | 9/1944 | Edgerton | 95/11.5 |
| 3,033,988 | 5/1962 | Edgerton | 315/241 P |
| 3,316,445 | 4/1967 | Ahrons | 315/241 P |
| 3,340,426 | 9/1967 | Elliott | 315/241 P |
| 3,481,258 | 12/1969 | Moni et al. | 95/10 C |
| 3,489,499 | 1/1970 | Biber | 95/10 C |
| 3,519,879 | 7/1970 | Ogawa | 315/241 P |

Primary Examiner—Lawrence J. Dahl
Attorney, Agent, or Firm—Clarence J. Fleming

[57] ABSTRACT

An automatic flash-limiting arrangement for use in combination with a flash unit associated with a camera and arranged to automatically terminate the light flash produced by the unit when the subject has been properly exposed, the flash-limiting arrangement being associated with the flash unit so as to become operative only upon initiation of a light flash, thus assuring that the arrangement will not respond to extraneous flashes occurring before the flash which is to be controlled. The flash-limiting arrangement is constructed to sense the light being received by the camera, to produce a signal which is the sum of a component proportional to the time integral of the intensity of such light and a component which is proportional to the instantaneous amplitude of the intensity of such light, and to terminate the flash when this signal reaches a predetermined value.

8 Claims, 13 Drawing Figures

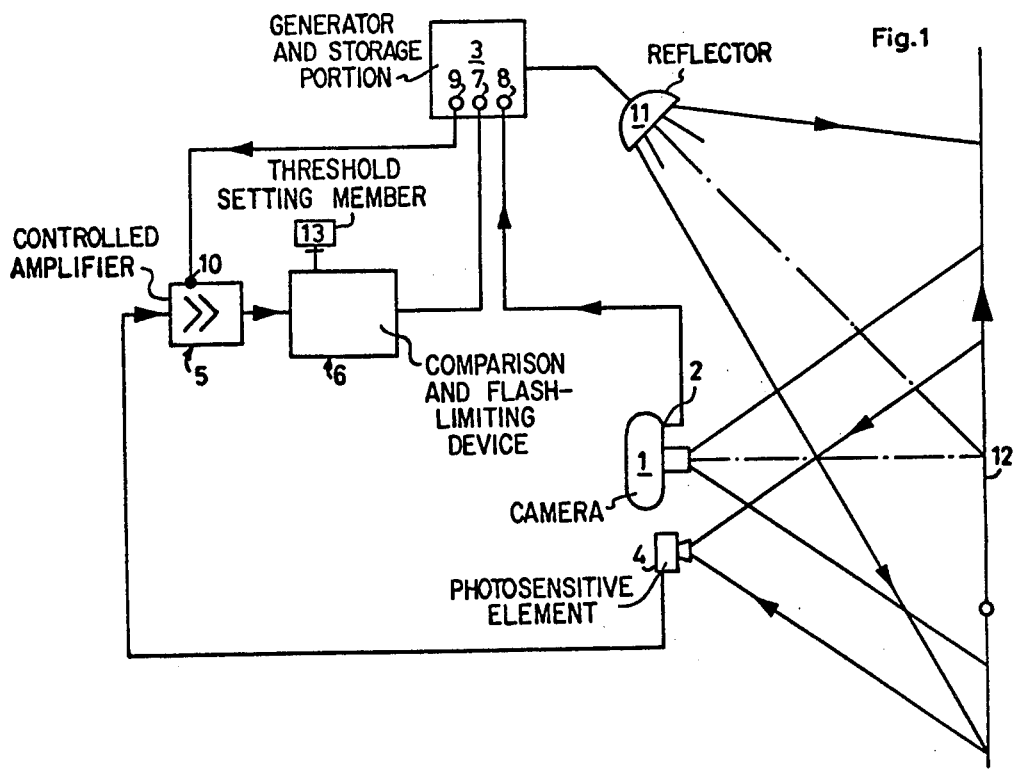
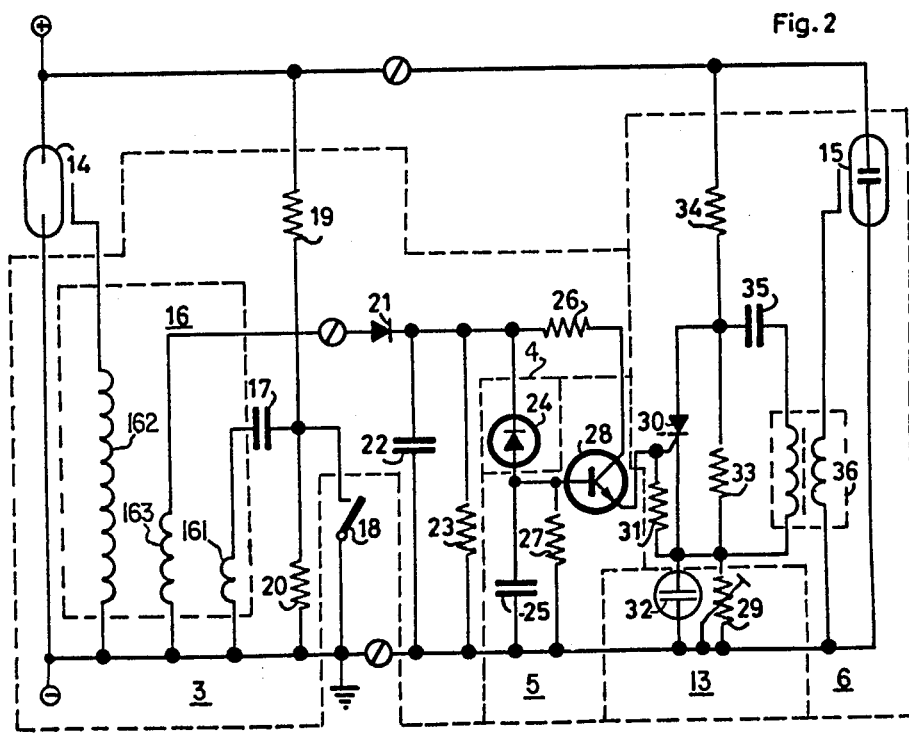

PHOTOGRAPHIC FLASH UNIT

BACKGROUND OF THE INVENTION

The present invention relates to photographic flash equipment and particularly to an automatic flash which is insensitive to extraneous light.

Automatic flash equipment is known in which the light reflected from the object to be photographed during the flash discharge is detected by a photosensitive member which controls the charging of an integrating capacitor with a current proportional to the intensity of the detected light. The electric charge thus stored is compared with a preset value which corresponds to the optimum exposure for the photographic material employed. If this comparison indicates that the detected light has reached such a value, a special device interrupts the flash emission.

Before a photograph is made, the camera is set to a certain aperture whose value is determined by the guide number of the flash equipment for the film in the camera, with unchanging film sensitivity, and according to the camera operating instructions. As a function of the distance to the subject to be photographed, there then is determined the exposure time, which is calculated and determined by the instrument from the amount of reflected light.

One known arrangement for performing this function has the drawback that an extraneous flash which is discharged before actuation of the camera shutter, and thus before actuation of the triggering device of the flash equipment associated with that camera, will have the effect of causing the storage device of that flash equipment to discharge at the wrong time. A narrowing of the coverage angle of the photosensitive member can reduce its responsiveness to extraneous flashes. However, this will not completely eliminate the undesirable effects of such extraneous flashes. At the same time, the limitation of the photosensitive device viewing angle introduces a drawback in that only the reflections from a small portion of the image field are sensed.

An arrangement is also known having a control amplifier which is blocked until the output from a photocell actuated by the flash of the associated electronic flash releases it. This solution is complicated and requires a separate battery for the light meter and flash-limiting device or the simultaneous use of the battery of the electronic flash. With this arrangement it is impossible, however, to automatically operate the flash with energy supplied from the power mains without a special battery for the light meter and flash-limiting device.

SUMMARY OF THE INVENTION

It is a primary object of the present invention to overcome these drawbacks and difficulties.

Another object of the invention is to assure that the apparatus will invariably produce the proper exposure for the subject being photographed, so long as the subject is within the range dictated by the guide number of the apparatus.

A further object of the invention is to provide automatic flash apparatus whose operation is insensitive to extraneous flashes occurring before the initiation of a light flash by the apparatus.

Still another object of the invention is to prevent overexposures at short subject distances due to inherent time delays in the responses of the electrical elements of the apparatus.

Still another object of the invention is to provide apparatus which is readily adjustable to operate with different film sensitivities and different lens openings.

These and other objects according to the invention are achieved by the provision of certain improvements in an automatic photographic flash apparatus for use with a camera and including a flash unit, a flash limiting device having a photoelectric element arranged to respond to the light reaching the camera from the subject being photographed and connected to terminate the light emission by the unit in response to the light received by the photoelectric element, and power energy supply means connected to deliver flash triggering energy to the flash unit. According to the improvements of the invention, the light integrating and flash limiting devices are connected with the flash unit to become operative only by actuation of the firing means of the flash tube. This actuation lasts a short time, in particular for the duration of an uncontrolled flash. The flash limiting device is composed of control voltage producing means electrically connected to the photoelectric element and including a first component for producing a voltage proportional to the time integral of the intensity of the light received by the photoelectric element from the instant of commencement of a flash by the unit and a second component for producing a voltage proportional to the instantaneous value of such intensity, the voltage produced by the second component serving to compensate for inherent time delays in the response of the flash limiting device. The two components are electrically connected so that their respective voltages are added together to form a control voltage which, upon reaching a predetermined value, actuates the flash limiting device to terminate the light flash being produced by the flash unit. In further accordance with the invention, the flash limiting device includes setting means for adjusting the responsivity of the device in accordance with the sensitivity of the film used and the camera lens apperature being employed.

BRIEF DESCRIPTION OF THE DRAWINGS

FIG. 1 is a schematic block diagram of apparatus according to the invention.

FIG. 2 is an electrical circuit diagram illustrating a preferred embodiment of the invention.

DESCRIPTION OF THE PREFERRED EMBODIMENTS

Figure 3:
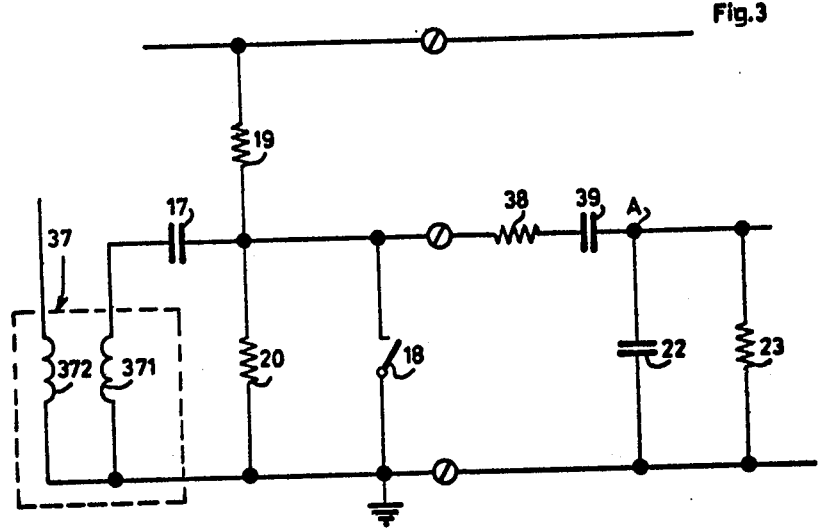
FIG. 3 is an electrical circuit diagram of a modified version of a portion of the arrangement of FIG. 2.

FIG. 1 shows the principal arrangement of the different structural groups. A camera 1 is arranged to photograph an object 12 which is illuminated by a flash tube disposed in reflector 11. The light reflected from the object 12 is simultaneously focussed by the lens of the camera 1 and sensed by an electric eye 4 of the automatic flash arrangement, the element 4 being disposed in the vicinity of the lens of the camera. Via an amplifier 5 the current from the element 4, which may be a photocell, a photodiode or any other type of light-sensitive device, preferably having an instantaneous response, is fed to a comparison and flash-limiting device 6.

The device 6 is preset to a predetermined threshold value for each picture or series of pictures taken under the same photographic conditions by a setting member 13 in accordance with the film sensitivity and the desired lens aperture setting. For increased film sensitivity and/or a larger aperture, a lower threshold value is set. For a lower film sensitivity, and/or a smaller aperture, e.g. for providing a greater depth of field, the threshold value for the light meter and flash-limitation device is increased.

According to the present invention, the amplifier 5 is unblocked by a signal via the conductor between the connections 9 and 10 and sent from a generator and storage portion 3 of the electronic flash only when its associated flash-triggering device is actuated. The synchronizing contact provided in camera 1 initiates this triggering via a line between connection 2 on the camera and connection 8 in generator portion 3 and this simultaneously renders the amplifier 5 operative by the signal sent between connections 9 and 10 to amplifier 5, thus permitting amplification of the output from light-sensitive component 4. The unblocking of the amplifier can be accomplished by releasing an amplifier stage, or by varying a potential, or simply by applying the necessary amplifier operating voltage. As soon as the preset threshold value in the comparison device 6 has been exceeded, a storage capacitor in portion 3 is short-circuited via the line between device 6 and connection 7 and this causes the flash emission by the lamp in reflector 11 to be terminated.

Thus amplifier 5 operates from the time the light-emitting flash tube in the lamp is triggered and may be blocked again after a time which corresponds approximately to the longest possible flash duration. Only light occurring during this short interval of about 1/800 second can adversely influence the flash-limitation device. Even this influence can not be considered to constitute an actual faulty response since both the photosensitive element of the flash-limitation device and the camera receive substantially the same light and the flash-limitation device disconnects after receiving the preset sufficient amount of light. Only the distribution of light on the subject being photographed can be undesirably modified by an extraneous flash.

The possibility of separating the flash tube from the light meter arrangement makes possible the use of off-camera flash, i.e. illumination by a device which is laterally offset from the image axis or by a plurality of devices. It is, of course, also possible to place only the photocell near the camera and to house the light meter and flash-limitation device in the flash equipment.

The use of a light meter and flash-limitation device spatially separated from the flash equipment and its supplemental light sources, and the triggering of the flashes according to the teachings of German Pat. No. 1,111,290 or German Pat. No. 1,160,948, or by remote control without wire connections employing luminous or electrical signals is possible with similarly controlled circuits.

The idea of switching on a light meter and flash-limitation device simultaneously with the triggering of the flash results in a simultaneous generation of the voltages for feeding the light meter and flash-limitation device.

FIG. 2 shows a circuit for permitting the generation of such voltages directly from the discharge of a capacitor 17 to trigger a flash by tube 14. Capacitor 17 is charged from a battery or AC-DC converter connected between terminals $\oplus$ and $\ominus$ via a voltage divider composed of resistors 19 and 20. The discharge of capacitor 17 occurs when a synchronizing switch 18 is actuated, this switch being either a contact operated by the camera shutter or a manual switch located at the electronic flash, and creates a voltage surge in the primary winding 161 of a triggering transformer 16 and this induces a voltage pulse in secondary winding 162 which triggers the flash tube 14, and simultaneously creates, in the tertiary winding 163, a voltage surge which charges the storage capacitor 22, via rectifier 21, to produce the supply voltage for the light meter arrangement. Capacitor 22 discharges slowly through a resistor 23 having a high resistance so that during the longest possible flash duration which can be of the order of 1 msec, the voltage across capacitor 22 remains practically constant.

Another embodiment of a storage capacitor charging sub-circuit according to the invention is illustrated in FIG. 3. Contrary to the arrangement according to FIG. 2, the FIG. 3 sub-circuit employs a conventional triggering transformer 37 having a primary winding 371 and a secondary winding 372. The supply voltage for the light meter and flash-limitation device is generated, upon closing of the synchronizing contact 18, by a change in charge level of capacitor 39. A current-limiting resistor 38 prevents the creation of an undue load on the synchronizing contact in the camera during this change in charge level. The change in charge level occurs as follows:

After the d.c. voltage converter or the mains connection in the generator portion 3 of the flash equipment shown in FIG. 1 has been turned on, the flash triggering capacitor 17 is charged via voltage divider 19-20, as is capacitor 39. Since a resistor 23 is disposed in parallel with capacitor 22, the voltage at point A is practically equal to zero. When contact 18 is closed, the charge on capacitor 39 changes simultaneously with the triggering of the flash tube. There now appears a voltage at point A which is inversely proportional to the capacitances of capacitors 22 and 39. The voltage at point A is then determined by the capacitances of capacitors 22 and 39 in such a manner that it serves to operate the light meter and flash-limitation device, this voltage being required to have the necessary operating value only for a period equal to the longest desired flash duration.

The generation of the operating voltage by the flash-triggering process facilitates the division of the automatic flash instrument into a control portion disposed near the camera and a flash portion which can be positioned at a location separate from the camera in accordance with photographic requirements.

Figure 4:
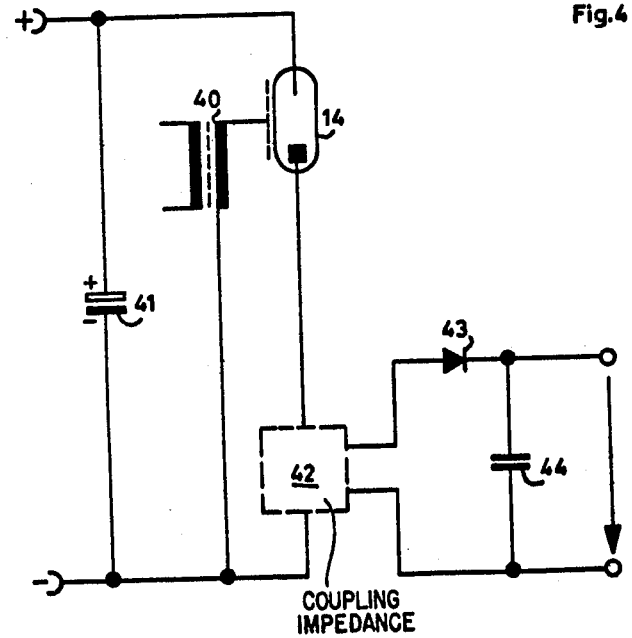
FIG. 4 is a view similar to that of FIG. 3 showing another modified version of a portion of the circuit of FIG. 2.

A further possibility for producing a voltage to trigger and operate the light meter and flash-limitation device is shown in FIG. 4 wherein a coupling impedance 42 is connected in the path of the flash discharge, the discharge current from the storage capacitor 41 creating a voltage drop across this impedance 42 via the flash tube 14 after the tube has been triggered by a signal applied to transformer 40. The voltage across impedance 42 is again fed to a storage capacitor 44 via a diode 43 which here serves as a block against reverse discharge. Impedance 42 can be constructed as an ohmic resistance, an inductive resistance, or as the primary winding of a transformer, which at the same time transforms the voltage drop to the level of the required operating voltage.

The use of a transformer makes possible a simple stabilization of the output and operating voltages by an appropriate selection of iron saturation. The use of a Zener diode instead of a resistance permits the production of an operating voltage at the level of the Zener voltage. These techniques thus permit the operating voltage to be maintained at a sufficiently constant level for the required operating period of at most 1/800 sec.

Returning now to FIG. 2, the light produced by tube 14 and reflected from the object to be photographed is received by the photosensitive element, here constituted by a photodiode 24 of the light meter and flash-limitation device, to vary the current therethrough, and hence to charge capacitor 25 at a rate proportional to the reflected light intensity. Capacitor 25 is connected in parallel with a resistor 27. The voltage across this capacitor 25 thus increases with the exposure time and is applied to the base of the amplifier transistor 28. As soon as the voltage across capacitor 25 has reached the required value, the transistor becomes conductive and fires a thyratron or thyristor 30 forming a part of device 6. Thyratron or thyristor 30 in turn fires a flash-limiting tube 15 by discharging a triggering capacitor 35 in the flash-limiting device through a firing transformer 36. The firing of this flash-limiting tube creates a short circuit across tube 14 and thus terminates the flash being produced by tube 14. Capacitor 35 is initially charged, when the apparatus is turned on, via the voltage divider constituted by resistors 33 and 34.

The bias of transistor 28, which determines the base voltage level required to render the transistor conductive, is adjusted by controlling a potentiometer 29 connected in parallel with an electrolytic capacitor 32. A high bias level is set for the required long exposure time due to low film sensitivity or small aperture setting whereas a high film sensitivity or large aperture requires a low bias voltage to create a more rapid response of the flash-limiting device.

Figure 5:
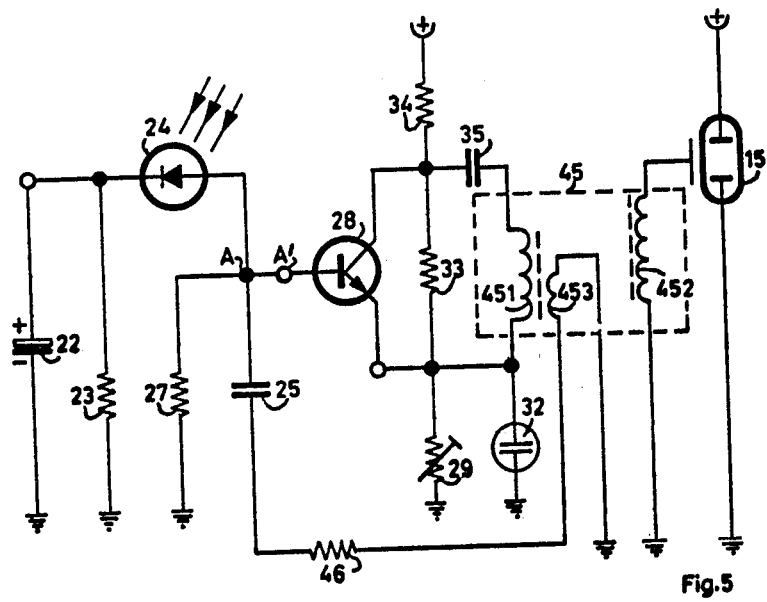
FIG. 5 is a view similar to that of FIG. 3 showing another modified version of a portion of the circuit of FIG. 2.

FIG. 5 shows a similar light-responsive device again comprising photodiode 24, integrating capacitor 25, high-resistance discharge resistor 27 and switching transistor 28 biased via a potentiometer in its emitter path, but with a modified triggering device for the flash-limiting tube 15. The triggering capacitor 35 is here connected in series with the primary winding 451 of a triggering transformer 45 and this series arrangement is disposed in parallel with the emitter-collector path of transistor 28 which here acts as a switching transistor. The series arrangement is connected to ground via an electrolytic capacitor 32. Transformer 45 also includes a feedback winding 453 connected in series with a resistor 46 to provide a feedback signal to capacitor 25. Finally, transformer 45 has an output winding 452 connected to activate tube 15.

As soon as the voltage at point A, which is the voltage across capacitor 25, exceeds the emitter bias, transistor 28 becomes conductive, and the triggering capacitor 35 begins to discharge to produce a feedback surge from the feedback winding 453 to the base of switching transistor 28, the polarity of which feedback is such as positively to render the transistor conductive and thus to assure firing of the flash-limiting tube 15. The precise timing of this triggering process can be adjusted by an appropriate selection of the values of resistor 46 and capacitor 25.

Figure 6:
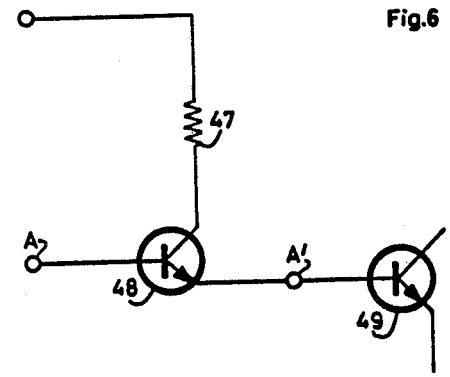
FIG. 6 is a circuit diagram showing a modified portion of the circuit of FIG. 5.

If the control power supplied to transistor 28 should not be sufficient to switch the transistor quickly and completely, it is possible, as shown in FIG. 6, to employ an arrangement composed of two transistors 48 and 49, transistor 48 being supplied with an operating voltage via resistor 47. The primary control signal is applied to transistor 48 at its base terminal A. When this signal is sufficient to render transistor 48 conductive, transistor 49 is turned on by a higher power control signal applied to terminal A'. Transistor 49 is connected so that its collector emitter current triggers the flash-limiting operation in a manner similar to that shown in FIG. 2 or 5 for transistor 28.

Figure 7:
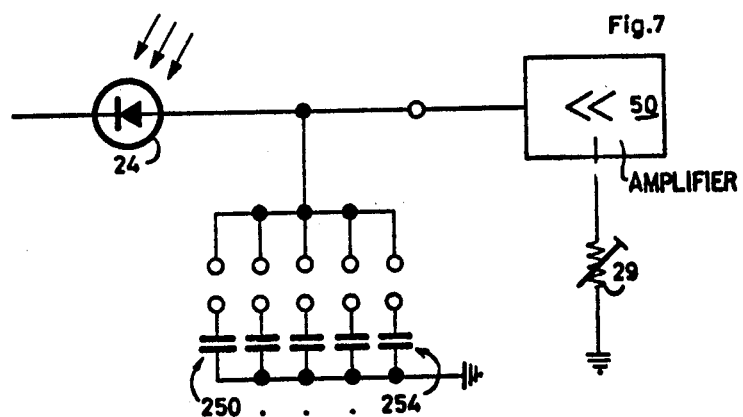
FIG. 7 is a view similar to that of FIG. 6 showing a further modified version of a portion of the circuit of FIG. 5.

By controlling potentiometer 29 in the circuit of FIG. 2 or 5, the threshold value of the light meter arrangement is adjusted at the transistor by a control of the emitter bias. The same effect on the response of the flash-measuring arrangement and the trigering of the flash-limiting device can be achieved, as shown in FIG. 7, by changing the capacitance value of the integrating capacitor, for example by providing five stages 250-254 and varying the stage or number of stages connected to the amplifier input. Potentiometer 29 can then be employed to achieve a fine control of the amplifier response for values between those produced by the capacitor stages.

Figure 8:
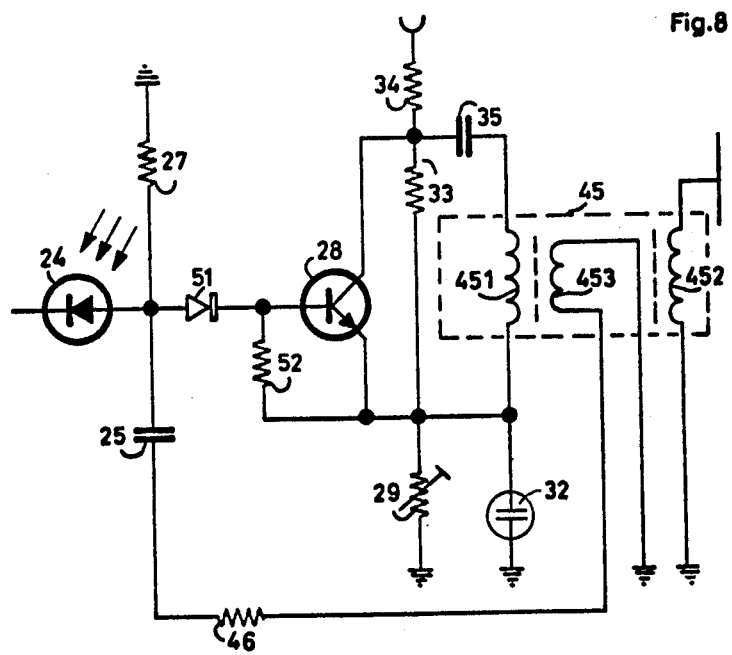
FIG. 8 is a view similar to that of FIG. 5 showing still another modified version of a portion of the circuit of FIG. 2.

In other embodiments of the invention storage capacitor 22, which supplies the control voltage for the light meter and flash-limiting arrangement, can be arranged to store a voltage which is higher than the reverse voltage of the transistor. This depends on the design of the voltage generation sub-circuit. Such a voltage would have to be matched by a corresponding threshold value, e.g. the emitter bias of transistor 28, as shown in FIG. 8, and since it would be substantially higher than the permissible reverse voltage for the transistor, a silicon diode 51 is preferably inserted in the transistor base circuit together with a base-emitter resistor 52. The bias voltage at the emitter and the integrating voltage across the integrating capacitor 25 can then be permitted to reach higher values without endangering the transistor. This results in a wide control range for the light meter and the flash-limiting device.

The integrating capacitor 25 must be substantially completely discharged after the flash is completed and before the electronic flash instrument has been fully recharged for the next flash. The high-ohmic resistor 27 serves to accomplish this discharge. Since the entire control process must be completed in no more than 1 msec, the voltage decrease occurring during this time due to the slow discharge which has already started will not be troublesome.

The time until the flash discharge is terminated by short-circuiting the flash tube can thus be influenced electrically by a change in the size of the integrating capacitor or by adjusting the threshold value of the triggering circuit. Alternatively, just as the amount of reflected light which impinges on the film can be varied by a change in f-stop of the lens in the camera, it is possible to vary the amount of light reaching the photocell in the same sense. According to the present invention, this can be achieved by placing a disc with gray segments of varying density in front of the opening of the photosensitive member. When this member is set for full light transmission the light-limiting device will respond, and the flash discharge will be terminated in the shortest possible time. This setting corresponds to the largest aperture which can be set on the camera according to the operating instructions furnished with the automatic flash equipment. If it is desired to use a higher f-stop, e.g. to increase the depth of focus by stopping down the lens by one stop, the next darker gray segment can be placed in front of the photocell to cut the amount of light permitted to pass to the photocell in half. For an aperture decrease of two f-stops, the next gray segment is placed in front of the cell and the amount of light to the cell is quartered. The flash termination occurs correspondingly later.

If suitable photoelectrical components were available, it would also be conceivable to control the amount of light by means of a mechanical diaphragm.

Figure 9:
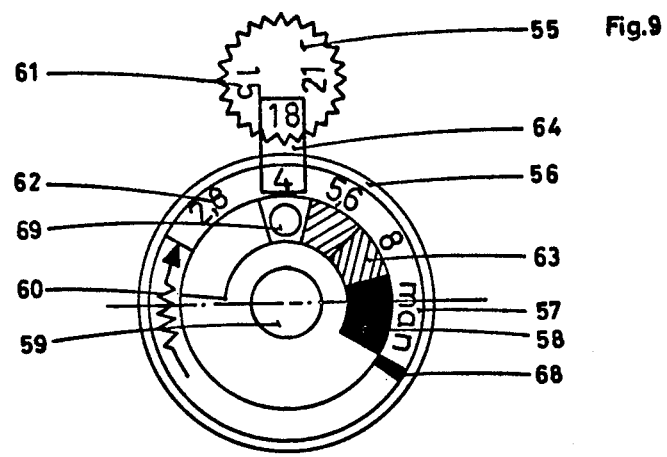
FIG. 9 is an elevational view of a preferred embodiment of a setting unit for use with the circuit of FIG. 2.
Figure 10:
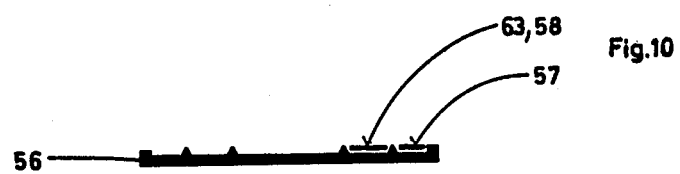
FIG. 10 is an elevational view of a portion of the device of FIG. 9.
Figure 11:
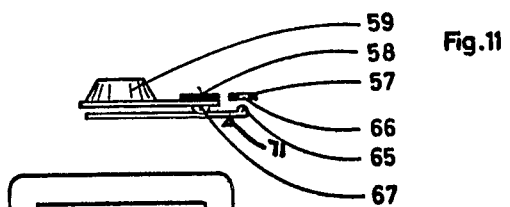
FIG. 11 is a view similar to that of FIG. 10 of another portion of the device of FIG. 9.

FIGS. 9 to 11 show one embodiment of such a mechanical light-metering setting arrangement. The film-sensitivity values 61 (here shown as DIN values) are presented on a setting wheel 55. The wheel is so moved that the film sensitivity number, in DIN, appears in window 64. When setting the wheel 55, the support disc 56 is carried along therewith, via suitable gears (not shown), so that the f-stop number, carried on a ring 57, for the desired camera setting appears in window 64 below the film sensitivity number when the aperture of the light meter device is fully opened, the f-stops being indicated at 62. Another element 58 carries gray segments 63.

In the illustrated example the camera is to be set to f:4 for 18-DIN film for a maximum camera-to-subject distance of 5 m this being for a flash having a guide number of 20. The depth of field at f:4, particularly for closeup pictures, is small, being for example, only 11 cm at a distance of 2 m and for a circle of confusion of 1/100 mm. If less strict requirements exist for picture sharpness, e.g. with a circle of confusion of 1/50 mm, the depth of field can be 22 cm. For a subject distance of 2 m only a small portion of the light power available during each flash is utilized in the case of automatic operation. The rest is used up in the short circuit.

At f:5.6, however, the depth of field becomes 15 or 33 cm, respectively, and at f:8 these depth values would be 22 or 45 cm, respectively. At f:8 the instrument on which this example is based, and whose flash unit has a guide number of 20, would be able to photograph to a distance of 2.5 m at this automatic setting, and at f:5.6 to a distance of 3.6 m.

By rotating the selection button 59, shown in FIGS. 9 and 11, the gray segment carrying disc 58 can be so set that when the switch button 59 is depressed, coupling 65, 66, 67 engages and the f-stop scale 57 is taken along with disc 58 and shows the desired f-stop, e.g. 8, in the window 64.

This now establishes a maximum photographing distance of 2.5 m and permits automatic flash operation with a greater depth of field and a substantially longer flash duration than with automatic operation at f:4. Spring 60 and abutment 68 are mounted on support 56 which remains stationary during these f-stop varying operations.

In the operation of the device of FIG. 9, wheel 55 is rotated until the film sensitivity number appears in window 64, the support disc 56 and ring 57 being rotated with wheel 55. The aperture of the lightmeter device is fully opened. The f-stop number, carried on ring 57, that appears in window 64, indicates the required setting for the shutter of the camera.

The aperture value is predetermined by the guide number of the flash equipment for automatic flash operation within the predetermined distance. No lower f-stop, i.e. larger aperture on the shutter of the camera, is possible without changing the capacitance value of the integration capacitor 25 of FIG. 2 or capacitor stages 250–254 of FIG. 7.

The disc 58 carrying grey segments is rigid with button 59, as shown in FIG. 11. By pressing down on button 59, ring 57 with its f-stop scale is coupled with disc 58 by means of a pin 65 which enters hold 66 and which is moved by the jointed coupling 65, 66, 67, 71, shown in FIG. 11.

By attenuating the transmission of the light to the photocell, the time required for the voltage across integration capacitor 25 to reach the predetermined value increases and, in accordance therewith, the film exposure time also increases.

When the button 59 is released, the coupling 65, 66, 67 is released and under the influence of spring 60, the ring 57 returns to its rest position against abutment 68.

When 21-DIN film is used and f:5.6 is set in window 64, automatic operation is possible up to 5 m and with 15-DIN film operation is possible at the same distance when f:2.8 is employed as the normal setting.

If, however, dial switch 59 is turned all the way counterclockwise into its final position, instead of a gray segment 63, a completely opaque disc segment appears in front of the photoelectric cell 69 and at the same time the indication "Man" (manual) appears in window 64. The instrument then operates as a conventional electronic flash with the camera aperture being determined from the guide number and distance, if necessary with the use of an aperture stop calculating disc.

Figure 12:
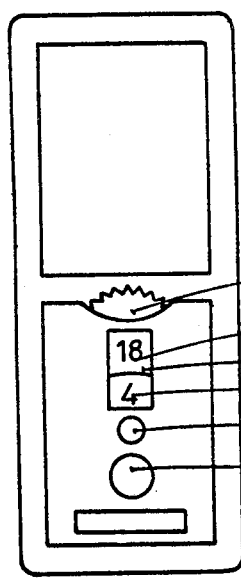
FIG. 12 is an elevational view of a housing containing the mechanism of FIG. 9.

FIG. 12 shows the appearance of the unit when disposed in a housing.

In spite of the high speed with which the individual components of the light meter and flash-limiting device respond, the cumulative delays of the individual switching components result in a measurable time lag in the system response. This switching time lag has such an effect that the more the distance from the object is reduced the slower is the response of the illumination-limiting device so that the film becomes overexposed from the undesirable delay in terminating the flash.

According to the invention, a compensating voltage is added to the integrated voltage proportional to the intensity of the reflected light in order to compensate for the switching time lag and thus flash limitation is accomplished at the desired moment of optimum film exposure.

Figure 13:
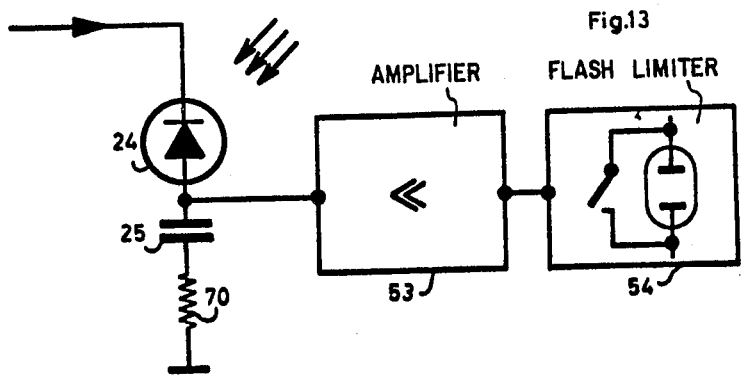
FIG. 13 is a circuit diagram showing yet a further modified version of a portion of the circuit of FIG. 2.

FIG. 13 shows one embodiment of a suitable compensating circuit. The compensation occurs by insertion of a resistor 70 in series with the integrating capacitor 25.

At the beginning of the light flash reflection, and attendant charging of the integrating capacitor 25, a bias voltage develops across resistor 70 on which the charge voltage of the integrating capacitor builds during the exposure process. Due to the voltage drop across resistor 70, which is proportional to the forward current through photodiode 24, the current itself being proportional to the received light intensity, the time to flash termination can be shortened by an amount equal to the delay occurring through the entire circuit.

FIG. 13 shows the general relation of the charging circuit to an amplifier 53 and flash limiter 54.

It may thus be seen that the present invention operates so that the triggering device for the flash itself actuates the light meter device via a special switch-on device. Only those extraneous flashes which occur after initiation of this flash can influence the control system.

If these extraneous flashes are not from directly in front of the camera, their influence is only significant if they happen to be stronger than the light emanating from the flash instrument being controlled, particularly since such extraneous flash also contributes to the light shed on the subject being photographed. Such conditions are, however, highly unlikely. The light meter arrangement becomes responsive, upon actuation of the triggering device, to measure the reflected light and is switched on only as long as required, corresponding to the longest possible flash duration.

This feature has the further advantage that triggering of the electronic flash equipment can simultaneously furnish the supply voltage for the light meter and flash-limiting device of the flash control portion. This means that the arrangement according to the present invention can be used for any flash equipment connected to a power mains.

A further development of the present invention provides that when the synchronizing contact on the camera is closed, the supply voltage for the light meter and flash-limiting device is supplied by the triggering arrangement itself or by a capacitor circuit coupled thereto. The supply voltage generated in this way is stored in a capacitor which is slowly discharged via a high-ohmic resistor. The discharge must be completed, in any case, before the electronic flash recharges. Even during the longest flash duration of about 1 ms, the operating voltage supplied by this capacitor will remain sufficiently constant with respect to the light-current-dependent charging of an integrating capacitor and with respect to the subsequent limitation of the flash emission.

Depending on the type of triggering employed, the operating voltage can also be generated for the light meter and the flash-limitation device by providing an impedance in the path of the flash discharge, thus producing a voltage drop of the required amplitude when the light-emitting gas-discharge lamp is actuated by means of the discharge current from the storage arrangement in the generator portion of the electronic flash. The impedance can be a resistance, or an inductance, or can be constituted by a Zener diode to produce an amplitude-limited voltage drop.

Since this voltage drop, which diminishes the energy available for triggering the flash emission, should be kept as low as possible, the primary winding of a transformer could be employed as the inductive resistance in order to extract the required supply voltage, which is generally of the order of 10 to 20 V, from the transformer secondary winding. In addition, appropriate dimensioning of the transformer and core, and thus favorable adjustment of its saturation point, could also result in a stabilization of the transformer output voltage.

The light is measured by detecting, by means of a photosensitive element, a portion of the light reflected by the object to be photographed, if possible across the entire image field, and by connecting the photosensitive element to control the charging of an integrating capacitor from the above-described voltage source in proportion to the received light value. After the integrating capacitor voltage has reached a preset threshold value of a gating circuit, an electronic switch is actuated via a triggering device to short-circuit the flash tube, thus suddenly terminating its light emission.

The threshold value of the gating circuit is adjusted for example, when the aperture opening of the camera lens is changed or when a film having a different light-sensitivity is used.

A constant threshold voltage can, of course, also be used if a fixed lens aperture is used which corresponds to the sensitivity of the photographic film.

The threshold value of the gating circuit assures that the film will be properly exposed by an amount corresponding to the time integral of the intensity of the light reaching the photosensitive element. When a constant threshold value is provided for the voltage-comparing member, e.g. a transistor, the flash duration can be adjusted by varying the capacitance of the integrating capacitor. Adaptation to a different lens aperture or film sensitivity can be accomplished by changing the capacitance of the integrating capacitor or by changing the bias on the voltage-comparing switching element. When both techniques are used together, the variation of the bias may be used to effect a fine adjustment of the system response.

The short-circuit arrangement and the flash-limiting arrangement require the supply of a certain minimum activating power from the light meter arrangement. By using a two-stage transistor amplifier the sensitivity of the arrangement can be increased. It is also possible, however, to use a triggering arrangement with feedback to achieve an accurate and rapid switching of the short-circuit switch.

When the threshold value is controlled by adjusting the bias, the permissible reverse voltage, for example of the transistor used as the voltage-comparing member, must be taken into consideration. By connecting a silicon diode into the transistor base lead an increase of the control range is possible without endangering the voltage-comparing component by a bias which exceeds the permissible reverse voltage.

The idea of adapting the light meter and flash-limitation device to the type of film used or to the desired aperture can also be realized in a purely optical manner. By blocking out the light-sensitive component, i.e. the photodiode for example, or by employing a series of filters of varying transparency corresponding to the several lens apertures or film sensitivities, the integration rate can be controlled. Completely covering the photodiode results in an effective disconnection of the light meter and flash-limitation arrangement. Then, the electronic flash continues to emit the maximum output corresponding to its guide number, but it operates in the conventional manner without automatic operation.

All of the switching elements exhibit unavoidable switching delays. The sum of these switching time lags, which are extremely short individually, is noticeable particularly in the case of closeups and for flash durations of between 0.05 msec and 0.02 msec in that the resulting delay in the flash termination results in a noticeable overexposure of the subject being photographed.

According to the present invention, this is avoided by connecting an appropriately dimensioned resistance in the path of the integrating circuit to produce a voltage drop which is dependent on the intensity of the reflected light and which is used as a bias for the integrating capacitor, thus compensating for the inevitable circuit time lag. The amplitude of this bias increases as the flash-to-subject distance decreases, i.e. as the subject is more intensely illuminated. Therefore, this bias voltage becomes more effective as the required flash duration decreases and thus assures a precise exposure for the subject being photographed.

It will be understood that the above description of the present invention is susceptible to various modifications, changes and adaptations.

We claim:

1. In an automatic photographic flash apparatus for use with a camera and including a flash unit, a flash-limiting device having a photoelectric element arranged to respond to the light reaching the camera from the subject being photographed and connected to terminate the light emission by the unit in response to the light received by the photoelectric element, and power energy supply means connected to deliver flash-triggering energy to the flash unit, the improvement comprising:

said apparatus including means electrically connecting said flash-limiting device with said flash unit for rendering said flash-limiting device operative only upon initiation of a flash-triggering signal to said flash unit, said flash-limiting device including control voltage producing means electrically connected to said photoelectric element and also including a component for producing a voltage proportional to the time integral of the intensity of the light received by said photoelectric element from the instant of commencement of the triggering of a flash by said unit, said component being electrically connected so that its voltage forms a control voltage which, upon reaching a predetermined value, actuates said flash-limiting device to terminate the light flash being produced by said flash unit, said flash unit including a flash-triggering transformer arranged to produce a flash-triggering pulse when a flash is to be produced and also including a secondary winding across which a voltage pulse is induced by such flash-trigger pulse, and said flash limiting device further including a storage capacitor connected to provide operating power for said flash-limiting device and a rectifier connected between said secondary winding of said flash-triggering transformer and said storage capacitor for causing the voltage induced in said secondary winding to charge said capacitor to the voltage required for rendering said flash-limiting device operative, and setting means for adjusting the responsivity of said device in accordance with the sensitivity of the film used and the camera lens aperture being employed.

2. Flashlamp apparatus comprising flash tube, a storage capacitor for storing energy to sustain a flash in said flash tube, means for initiating a flash in said flash tube, short circuiting means operatively connected in parallel with said flash tube and serving, when actuated, to discharge said capacitor and terminate any flash then in progress in said flash tube, light measuring means responsive to light received from a subject for generating a measuring impulse when the received light reaches an adjustable threshold value, said impulse when reaching said short circuiting means serving to actuate said short circuiting means, and switching circuit means effective to convey said measuring impulse to said short circuiting means substantially only during the time that a flash in said flash tube is in progress and to block said measuring impulse from reaching said short circuiting means at other times, said switching circuit means being normally effective to block said measuring impulse from reaching said short circuiting means and being rendered effective to convey said measuring impulse to said short circuiting means by a starting pulse when a flash is initiated in said flash tube, independently of light falling upon said switching circuit means.

3. A construction as defined in claim 2, wherein said short circuiting means includes a quench tube connected in parallel with said flash tube and having lower impedance than said flash tube, and quench tube firing means operated by an incoming measuring impulse to fire the quench tube to short circuit the flash tube and discharge said storage capacitor.

4. A construction as defined in claim 2, further including transformer means for initiating a flash in said flash tube, said switching circuit means being responsive to operation of said transformer means.

5. A construction as defined in claim 2, wherein said switching circuit means is controlled by said storage capacitor.

6. Apparatus as defined in claim 2, wherein the starting pulse of said switching circuit means is derived from said storage capacitor.

7. Flashlamp apparatus comprising a flash tube having a high voltage firing circuit for initiating a flash in said flash tube, a storage capacitor for storing energy to sustain a flash in said flash tube, pulse producing means responsive to incoming light for producing a pulse when the quantity of incoming light exceeds a threshold value, means responsive to a pulse for extinguishinng a flash in said flash tube, a conductor for conveying a pulse from said pulse producing means to said pulse responsive means, and switching means controlled by said high voltage firing circuit for permitting a pulse to be conveyed through said conductor when said high voltage firing circuit is actuated to initiate a flash and to be conveyed a short time thereafter, and for preventing a pulse from being conveyed through said conductor at other times.

8. Apparatus as defined in claim 7, wherein said means for extinguishing a flash in said flash tube includes means for discharging energy remaining in said storage capacitor, otherwise than through said flash tube.

* * * * *